US006068036A

United States Patent [19]

Cassidy

[11] Patent Number: 6,068,036

[45] Date of Patent: May 30, 2000

[54] LARGE PANEL SURFACE PLANER

[75] Inventor: James Cassidy, Wakefield, R.I.

[73] Assignee: The United States of America as represented by the Secretary of the Navy, Washington, D.C.

[21] Appl. No.: 09/246,195

[22] Filed: Jan. 11, 1999

[51] Int. Cl.[7] .............................. B27C 5/00; B23D 19/00

[52] U.S. Cl. ........................ 144/134.1; 83/471.2; 83/574; 144/144.1; 144/286.1; 144/286.5; 144/24.05; 144/114.1

[58] Field of Search .............................. 144/134.1, 135.2, 144/136.95, 137, 286.1, 286.5, 24.05, 144.1, 114.1; 83/471.2, 471.3, 574; 409/131, 181, 182

[56] References Cited

U.S. PATENT DOCUMENTS

| | | | |
|---|---|---|---|
| 3,130,758 | 4/1964 | McKinley | 83/574 |
| 3,186,452 | 6/1965 | Magnussen | 83/574 |
| 4,155,383 | 5/1979 | Welliver | 144/154.5 |
| 4,292,870 | 10/1981 | Mericke | 83/471.2 |
| 4,516,453 | 5/1985 | Parham, Jr. | 83/574 |
| 4,519,280 | 5/1985 | Cook | 83/574 |

*Primary Examiner*—W. Donald Bray
*Attorney, Agent, or Firm*—Michael J. McGowan; Robert W. Gauthier; Prithvi C. Lall

[57] ABSTRACT

A large panel surface planer is provided. The planer has a flat platform used as a mounting base. A pair of channel rails are clamped to the mounting base using c-clamps at the ends of each channel rail. A workpiece is secured to the flat platform using one or more pairs of back-to-back clamps which clamp both the workpiece and the flat platform. A pair of rectangular guide bars are clamped to and aligned orthogonally with the channel rails using a c-clamp at each end of each guide bar. A tool stop is also clamped at the channel rail-guide bar intersection providing both a tool stop and a spacer for alignment of the spacing between the guide bars. A cutting tool, such as a router, is then manually moved across the surface of the workpiece using the guide bar to hold the tool in position (both height and lateral position). After planing a particular set position, it is necessary to manually reposition the guide bar for the next cut and to continue sequentially until the entire workpiece has been planed.

8 Claims, 3 Drawing Sheets

LARGE PANEL SURFACE PLANER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The invention is related to planing and surface finishing and in particular to manually operated guides for planing large panels.

2. Description of the Prior Art

Large panels are typically surfaced using large and expensive milling machines. The alternative is hand planing and sanding to provide a flat surface. The hand finishing method requires both high skill and extended time for satisfactory results. In the case of smaller panels, the hand finishing method is reasonably acceptable. However, for larger panels, the accuracy of hand finishing is reduced and the time is greatly extended. Various jig guides and fixtures have been developed to assist in manual finishing of flat panels. These devices include various tables, clamping devices and router attachments. For example, U.S. Pat. No. 5,203,389 to Goodwin, provides a guide, which supports a router above a workpiece. However, a large workpiece cannot be planed if it exceeds the fixed size of the frame. Additionally, the frame cannot be greatly enlarged due to the construction of the slide mechanism. Other examples include U.S. Pat. No. 5,375,951 to Veale, which provides a complex custom device to serve as a bed for milling machine and U.S. Pat. No. 5,682,934 to Rybski, which is intended for shaping and cutting rather than planing. None of these devices are adapted to work with large panels. Additionally, many of the devices rest on the short lengths of the workpiece. A device resting on the short length of a workpiece can usually help to provide a smooth surface. However, due to surface irregularities, such a device cannot accurately provide a flat planar surface such as those produced by a milling machine. What is needed is a portable device, which can be attached to a workpiece, but stand clear so that a cutting tool may follow a planar path over the workpiece.

SUMMARY OF THE INVENTION

Accordingly, it is an object of the present invention to provide a surface-planing device suitable for large panels.

It is another object of the invention to provide a surface-planing device which can provide both a smooth surface and a flat, planar surface on a large panel.

It is yet another object of the invention to provide a surface planing device which can be attached to a workpiece while remaining clear of any surface irregularities.

It is a further object of the invention to provide a surface planing device having manually-operated tool guides adapted for use with common cutting tools.

The invention is a large panel surface planer comprising a flat platform used as a mounting base and having a pair of channel rails clamped thereon using c-clamps at each end of each channel rail. The workpiece is secured to the flat platform using one or more pairs of back-to-back clamps which clamp both the workpiece and the flat platform. A pair of rectangular guide bars are clamped to and aligned orthogonally with the channel rails using a c-clamp at each end of each guide bar. A tool stop is also clamped at the channel rail-guide bar intersection providing both a tool stop and a spacer for alignment of the spacing between the guide bars. A cutting tool, such as a router, is then manually moved across the surface of the workpiece using the guide bar to hold the tool in position (both height and lateral position). After planing a particular set position, it is necessary to manually reposition the guide bar for the next cut and to continue sequentially until the entire workpiece has been planed.

BRIEF DESCRIPTION OF THE DRAWINGS

The foregoing objects and other advantages of the present invention will be more fully understood from the following detailed description and reference to the appended drawings wherein corresponding reference characters indicate corresponding parts throughout the several views of the drawings and wherein.

DESCRIPTION OF THE PREFERRED EMBODIMENTS

Figure 1:
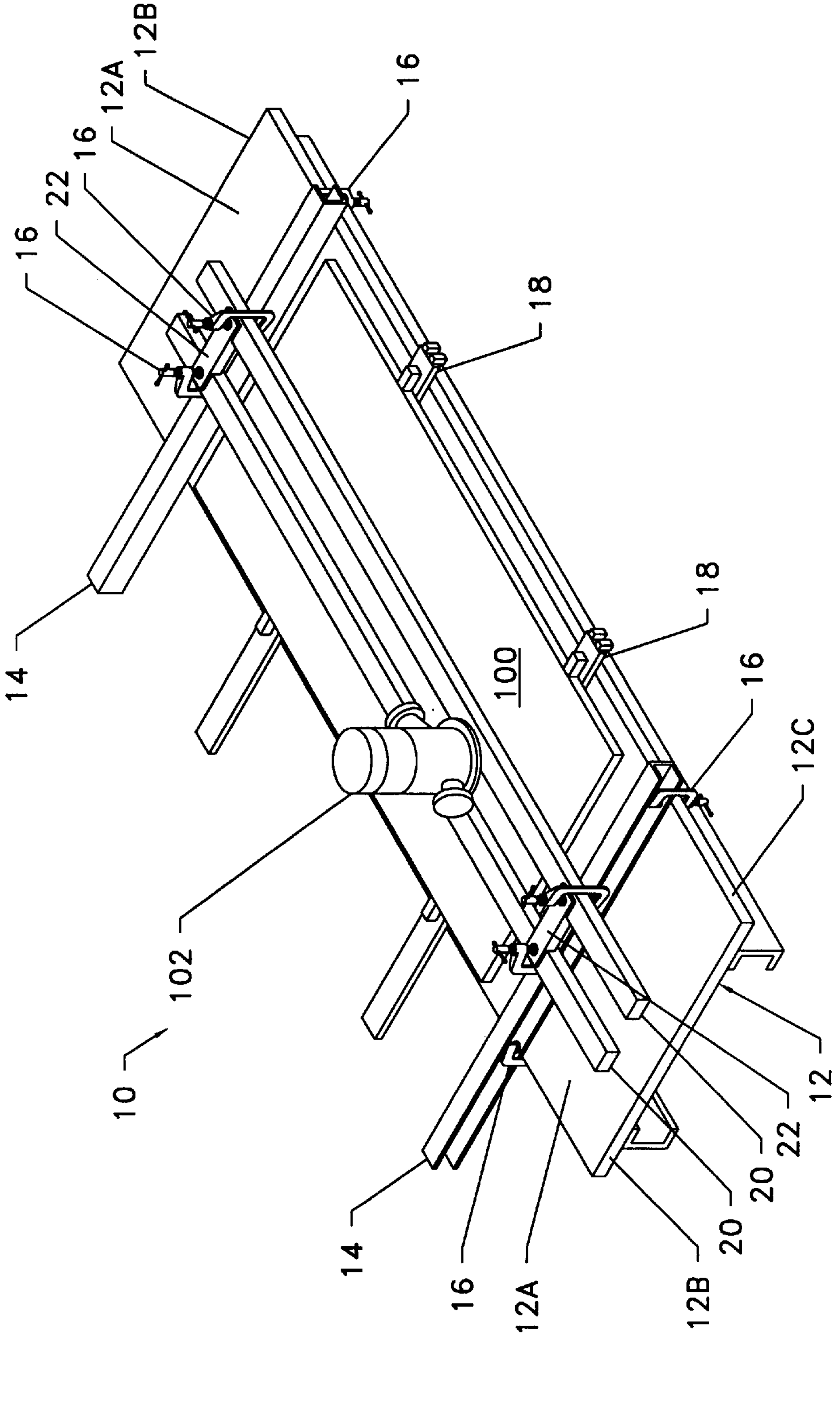
FIG. 1 is a perspective view of the large panel surface planer.

Referring now to FIG. 1, the large panel surface planer, designated generally by the reference numeral 10, is shown with its major components. The large panel surface planer 10 has a large rectangular-shaped flat platform 12 which serves as a support base for the entire assembly. A pair of channel rails 14 are positioned across the ends 12A of the flat platform 12, one rail on each end, and are aligned parallel to the end surface 12B of platform 12. These channel rails 14 are clamped in place by the first means for attaching, c-clamps 16, at the side edges 12C of the flat platform 12. The workpiece 100, a large panel which will be planed, is held in place on the flat platform 12 by a second means for attaching, the back-to-back clamps 18. Above the workpiece 100, rectangular guide bars 20 are positioned on top of and forming right angles with the channel rails 14 which are used as guide supports for the guide bars 20. The guide bars 20 are separated at each end by spacer/end stops 22 and held in place against the channel rails 14 by the third means for attaching, additional c-clamps 16. A cutting tool 102 is shown positioned on top of the guide bars 20 ready for planing.

Figure 2:
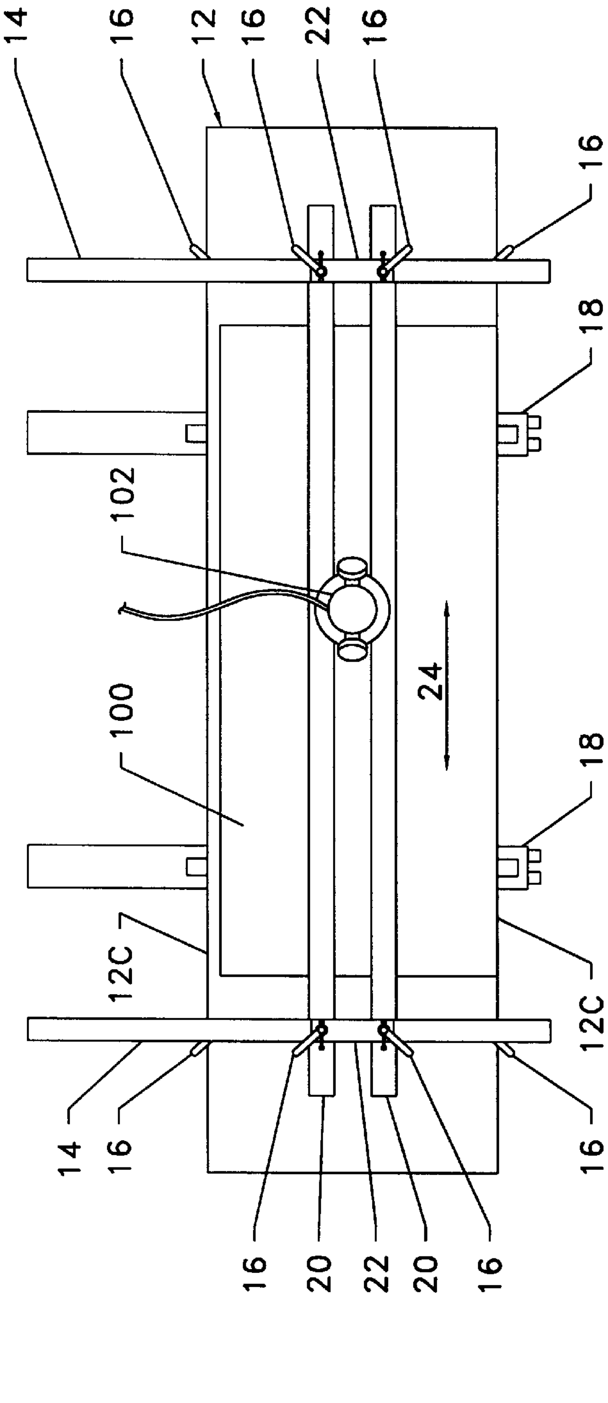
FIG. 2 is a plan view of the large panel surface planer.

Referring to FIG. 2, the planer can be seen from a top view. This view shows the channel rails 14 with the orthogonally positioned guide bars 20 mounted over workpiece 100 on the flat platform 12. The assembly is held in place by c-clamps 16 at the flat platform edges 12C and at the channel rail/guide bar intersections. The workpiece is held by back-to-back clamps 18. The cutting tool 102, illustrated as an electric router, is positioned between the guide bars 20 and is moveable laterally as depicted by arrows 24. The lateral movement of the cutting tool 102 is restricted by the spacer/end stops 22, the end stops striking the router base plate.

Figure 3:
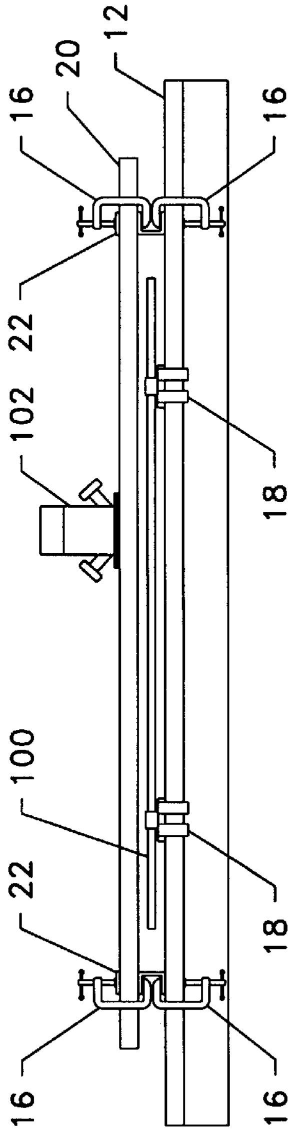
FIG. 3 is a front elevation of the large panel surface planer.

FIG. 3 shows the positioning of workpiece 100 over flat platform 12 and beneath guide bars 20. The cutting tool 102 is supported by guide bars 20. The entire assembly is clamped together, including the flat platform, by c-clamps 16, except the workpiece 100 which is held by back-to-back clamps 18.

Figure 4:
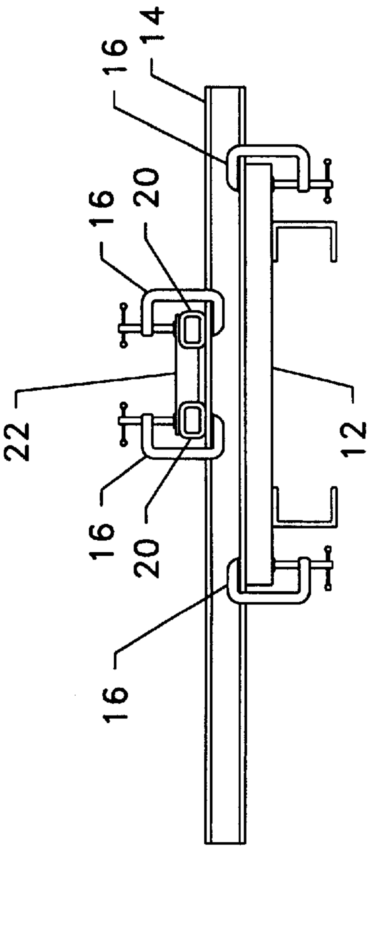
FIG. 4 is an end view of the large panel surface planer.

FIG. 4 shows the end view of the flat platform 12 with the channel rails 14 secured by c-clamps 16. The rectangular guide bars 20, separated by spacer/end stop 22 are likewise clamped to the channel rails 14 by additional c-clamps 16.

Figure 5:
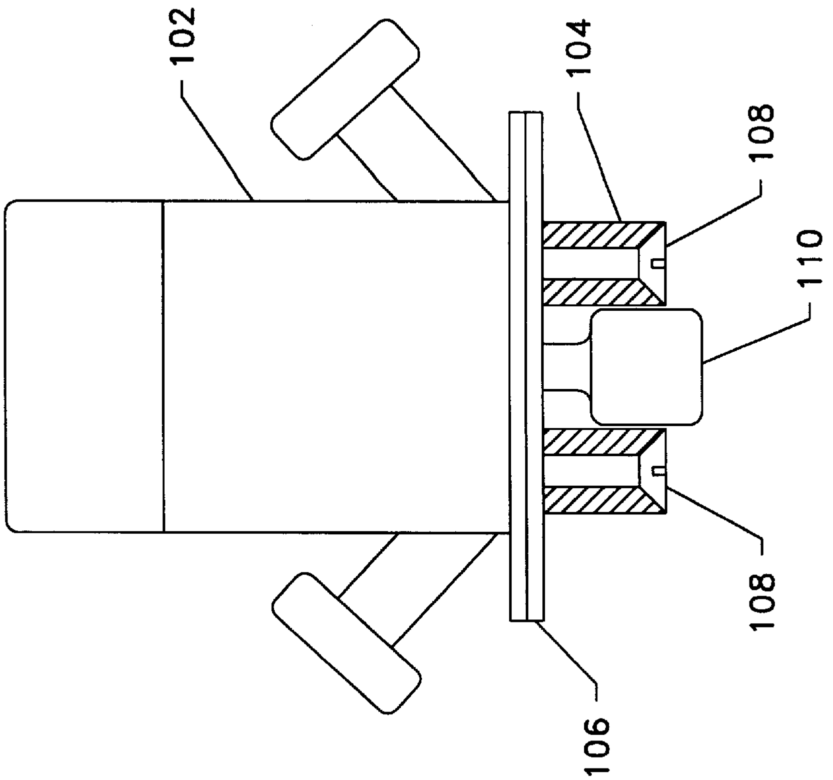
FIG. 5 is a view of the router and bushing assembly.

FIG. 5 shows a typical cutting tool 102 which is used in the large panel surface planer. This tool has a bushing 104 mounted by screws 108 located around the cutter 110. The bushing 104 engages the guide bars 20 and provides a straight, even path for manual movement of the cutting tool 102. The base plate 106 rides along the top of the guide bars 20 and maintains the proper elevation of the cutting tool 102.

The set up and operation of the invention is relatively fast and accurate compared to prior methods of manual planing. The workpiece 100 and channel rails 14 are clamped to the flat platform 12. Then guide bars 20 are clamped to the channel rails 14 and the cutting tool 102 is run back and forth across the workpiece 100. The channel rails 14 are then repositioned and another cut is completed. This process is repeated until the entire workpiece has been planed. After planing one side, the workpiece 100 is turned over to plane the opposite side.

The features and advantages of the invention are numerous. The large panel surface planer is assembled using commonly available components such as c-clamps, back-to-back clamps, channel rails and rectangular tubing. By repositioning the clamps and channel rails, different sized panels can be accommodated. Additionally, surface irregularities on the workpiece do not interfere with the production of a smooth and plane surface because the guide bars do not rest on the workpiece surface. Although the present invention has been described relative to a specific embodiment thereof, it is not so limited. The specific shape of the guide bars may be modified so long as the lateral rigidity is maintained. For example, the guide bar can be changed from rectangular to an I-beam or T-shape. Likewise, the channel rails may have other shapes provided rigidity is maintained. Also, a variety of clamps or clamping devices can be used. Clamping pliers can replace c-clamps. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A large panel surface planer comprising:

a base for securing a large panel thereto;

a pair of guide supports attached to said base separate from and at opposite ends of the large panel, each guide support spanning a length greater than the length of the end of the large panel; and a pair of guide bars each attached to said guide supports and spanning orthogonally between said guide supports above the surface of the large panel, said guide bars supporting a tool for planing the large panel surface to a planar surface, movement of the tool along the guide bars and movement of the guide bars along the guide supports defining the planar surface.

2. A large panel surface planer as in claim 1 wherein said base comprises a flat platform.

3. A large panel surface planer as in claim 1 further comprising a plurality of back-to-back clamps for securing the large panel to the base.

4. A large panel surface planer as in claim 1 further comprising a pair of end stops clamped between said pair of guide bars.

5. A large panel surface planer comprising:

a base for securing a large panel thereto;

a plurality of guide supports attached to said base separate from the large panel;

a pair of guide bars attached to said guide supports and spanning above the surface of the large panel, said guide bars supporting a tool for planing the large panel surface, movement of the tool along the guide bars and movement of the guide bars along the guide supports defining a planar surface; and c-clamps for attaching the plurality of guide supports to the base and for attaching the guide bars to the guide supports.

6. A large panel surface planer comprising:

a large flat base;

a plurality of back-to-back clamps for securing a large panel to said base;

a plurality of guide supports attached to said base separate from the large panel;

a plurality of c-clamps attaching said plurality of guide supports to said base;

a pair of guide bars attached to said guide supports and spanning above the surface of the large panel, the guide bars supporting a tool for planing the large panel surface, movement of the tool along the guide bars and movement of the guide bars along the guide supports defining a planar surface;

a pair of end stops located between said guide bars and attached thereto; and a plurality of c-clamps clamping said end stops to the guide bars.

7. A large panel surface planer as in claim 5 wherein said plurality of guide supports comprises channel rails.

8. A large panel surface planer as in claim 6 wherein said guide bars comprise rectangular tubes.

* * * * *

UNITED STATES PATENT AND TRADEMARK OFFICE

CERTIFICATE OF CORRECTION

PATENT NO. : 6,068,036

DATED : May 30, 2000

INVENTOR(S) : James Cassidy

It is certified that error appears in the above-identified patent and that said Letters Patent is hereby corrected as shown below:

Title page, Item [73]

DELETE ASSIGNEE:

"The United States of America as Represented by the Secretary of the Navy"

Signed and Sealed this

Tenth Day of October, 2000

Attest:

Q. TODD DICKINSON

*Attesting Officer* *Director of Patents and Trademarks*